US011060418B2

(12) United States Patent
Debray et al.

(10) Patent No.: US 11,060,418 B2
(45) Date of Patent: Jul. 13, 2021

(54) TURBOMACHINE EXHAUST CASING AND METHOD FOR MANUFACTURING SAME

(71) Applicant: SAFRAN AIRCRAFT ENGINES, Paris (FR)

(72) Inventors: Benoit Argémiro Matthieu Debray, Moissy-Cramayel (FR); Dominique Michel Fouquet, Moissy-Cramayel (FR); Grégory Ghosarossian-Prillieux, Moissy-Cramayel (FR); Guillaume Sevi, Moissy-Cramayel (FR); Patrick Sultana, Moissy-Cramayel (FR); Guy Vieillefond, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 235 days.

(21) Appl. No.: 16/301,386

(22) PCT Filed: May 15, 2017

(86) PCT No.: PCT/FR2017/051167
§ 371 (c)(1),
(2) Date: Nov. 13, 2018

(87) PCT Pub. No.: WO2017/203126
PCT Pub. Date: Nov. 30, 2017

(65) Prior Publication Data
US 2020/0326071 A1    Oct. 15, 2020

(30) Foreign Application Priority Data
May 26, 2016   (FR) ...................................... 1654734

(51) Int. Cl.
*F01D 25/24*      (2006.01)
*B23K 101/00*   (2006.01)
*F01D 25/28*      (2006.01)

(52) U.S. Cl.
CPC ........... *F01D 25/243* (2013.01); *F01D 25/24* (2013.01); *B23K 2101/001* (2018.08); *F01D 25/28* (2013.01)

(58) Field of Classification Search
CPC . F01D 25/28; F02K 1/04; B23K 26/24; F05D 2240/1281
See application file for complete search history.

(56) References Cited

U.S. PATENT DOCUMENTS

2006/0000077 A1   1/2006  Lundgren
2008/0105659 A1*  5/2008  Arnett ................ B23K 15/0006
                                                                219/121.14
(Continued)

OTHER PUBLICATIONS

International Search Report dated Sep. 11, 2017, issued in corresponding International Application No. PCT/FR2017/051167, filed May 15, 2017, 6 pages.

*Primary Examiner* — Todd E Manahan
*Assistant Examiner* — Alyson Joan Harrington
(74) *Attorney, Agent, or Firm* — Christensen O'Connor Johnson Kindness PLLC

(57) ABSTRACT

A casing is provided, for example, an exhaust casing for a turbomachine. The casing generally includes an inner hub having an axis of rotation and an outer annular ferrule extending around the hub, the ferrule configured to define, with the hub, an annular flow path for a gas stream. In some examples, the ferrule is rigidly connected to the hub by arms. The hub generally includes, at one longitudinal end, a scalloped annular flange comprising solid portions distributed at regular intervals about said axis and spaced apart from each other by hollow portions. The hub is produced by assembling several angular hub sectors arranged circumferentially end to end around the axis, each hub sector connected to an adjacent hub sector by a longitudinal weld bead that extends over substantially the entire axial extent of the (Continued)

hub and that is substantially aligned axially with a hollow portion of said flange.

17 Claims, 4 Drawing Sheets

(56) References Cited

U.S. PATENT DOCUMENTS

| | | | |
|---|---|---|---|
| 2010/0111685 A1 | 5/2010 | Sjunnesson et al. | |
| 2011/0262277 A1* | 10/2011 | Sjoqvist | F01D 25/162 |
| | | | 416/213 R |
| 2015/0143814 A1* | 5/2015 | Orosa | F01D 25/30 |
| | | | 60/796 |
| 2015/0152788 A1* | 6/2015 | De Sousa | F01D 25/30 |
| | | | 60/39.5 |
| 2015/0204212 A1* | 7/2015 | Mountz | F01D 21/045 |
| | | | 415/144 |
| 2016/0200443 A1* | 7/2016 | Bellabal | F02K 1/04 |
| | | | 415/213.1 |

* cited by examiner

TURBOMACHINE EXHAUST CASING AND METHOD FOR MANUFACTURING SAME

TECHNICAL FIELD

Embodiments of the present disclosure relate to a casing, in particular an aircraft turbomachine exhaust casing, and its manufacturing method.

BACKGROUND

The state of the art comprises in particular documents US-A1-2010/111685, US-A1-2006/000077, US-A1-2015/204212 and US-A1-2011/262277.

In a known manner, a turbomachine exhaust casing comprises an inner hub and an outer annular ferrule extending around the hub and an axis of revolution. The ferrule is configured to define, with the hub, an annular flow path for a gas stream and is rigidly connected to the hub by arms, substantially radial with respect to the abovementioned axis.

An exhaust casing is mounted downstream (by reference to the flow of the gases in the turbomachine) of a turbine and the gas stream which passes through the exhaust casing is therefore the combustion gas stream exiting the turbine.

A turbomachine can comprise other similar casings such as an intermediate casing. An intermediate casing is interposed between a low-pressure compressor and a high-pressure compressor of the turbomachine and is therefore passed through by a low-pressure compressor gas stream and intended to supply the high-pressure compressor.

This type of casing can comprise, at its longitudinal ends, flanges for fixing to other members of the turbomachine. The hub of the casing comprises, for example, at a longitudinal end, a scalloped annular flange comprising solid portions regularly distributed about the axis of revolution and spaced apart from each other by hollow portions. In the case of an exhaust casing, this flange makes it possible to connect the casing to an ejection cone of the turbomachine situated downstream.

In the current art, such a casing is manufactured by assembling several parts. The hub is produced from one single part and the arms and the ferrule, sectored or not, are returned and fixed on the hub.

The present disclosure proposes especially an improvement in manufacturing this type of casing.

SUMMARY

To this end, the disclosure proposes a casing, in particular an exhaust casing, for a turbomachine, comprising an inner hub with an axis of revolution A and an outer annular ferrule extending around the hub, the ferrule being configured to define, with the hub, an annular flow path for a gas stream and being rigidly connected to the hub by arms, the hub comprising, at a longitudinal end, a scalloped annular flange comprising solid portions regularly distributed about the axis and spaced apart from each other by hollow portions, characterised in that the hub is produced by assembling, by welding several angular hub sectors which are arranged circumferentially end to end around the axis, each sector being connected to an adjacent hub sector by a longitudinal weld bead which extends over substantially the entire axial extent of the hub and which is substantially aligned axially with a hollow portion of the flange.

The disclosure proposes a new way to manufacture a casing, especially an exhaust casing, not by an initially one-piece hub, but by a sectored hub, i.e. formed by assembling sectors. These hub sectors are welded, preferably by electron beam (EB), given the material thicknesses of the elements to be welded.

By the geometry of the hub, during the assembly phase, the electron beam can be led to pass through several skins simultaneously—in the zone of the abovementioned flange. EB welding is thus called "triple-skin", the beam being able to pass through simultaneously three skins, namely the flange, an annular stiffener of the hub and the ferrule.

EB welding is capable of that, but the passing through of multiple thicknesses requires more power and leads to less stability in the quality of welding obtained.

The design of flanges, such as the abovementioned flange, must take into account several functional and mechanical sizing requirements, which is conveyed by material thicknesses, a number of screws, a number and size of scallops or hollow portions, that conform with cost and weight requirements.

The solution proposed consists of the geometric optimisation of the abovementioned flange to make it possible to facilitate the procedure of welding the hub, especially by limiting the number of skins passed through.

For this, the thickness of the flange can be increased to make it possible, with mechanical iso-capacity, to expand and deepen the scallops. The angular positioning of the scallops is optimised such that each welding zone between two hub sectors is aligned with a scallop. This zone thus becomes a "double-skin" welding zone (or "single-skin" is the electron beam does not need to pass through a stiffener), which makes it possible to best control the welding, especially EB welding.

The casing according to the disclosure can comprise one or more of the following characteristics, taken by themselves or in combination with each other:

- the hub sectors are produced by casting,
- the number of hub sectors is equal to the number of arms of the casing,
- each hub sector is initially formed from one single part with a radially inner portion of one of the arms,
- the radially outer end of each of the arms is welded to the radially inner end of a radially outer end of this arm,
- the radially inner portion of each arm is substantially situated between two consecutive solid portions; two solid portions of the flange are thus located substantially on either side of the arm, which guarantees a good distribution of loads,
- the radially inner portion of each arm is substantially situated between a first longitudinal plane passing through the axis A and one of the solid portions of the flange, and a second longitudinal plane passing through the axis and another consecutive portion of these solid portions,
- the radially inner portion of each arm is substantially situated halfway from the two consecutive solid portions,
- each arm comprises an upper surface and a lower surface, each weld bead extending between the upper surface of a first arm and the lower surface of a second consecutive arm and being situated closer to the lower surface of the second arm than the upper surface of the first arm,
- the arms extend into the planes, substantially tangent to a circumference centred on the axis, and
- the hollow portions each comprise a median edge, substantially straight-lined and tangent to a circumference centres on the axis A; the angular position of the scallops or hollow portions is thus optimised such that each welding zone between two hub sectors is covered by a scallop in its straight-lined portion.

The present disclosure also concerns a turbomachine comprising at least one casing such as described above.

The present disclosure also concerns a method for manufacturing a casing, especially an exhaust casing, for a turbomachine, this casing comprising an inner hub and an outer annular ferrule extending around the hub and an axis of revolution A, the ferrule being configured to define, with the hub, an annular flow path for a gas stream and being rigidly connected to the hub by arms, the hub comprising, at a longitudinal end, a scalloped annular flange comprising solid portions regularly distributed about the axis and spaced apart from each other by hollow portions, characterised in that it comprises a step consisting of assembling, by welding, several angular hub sectors which are arranged circumferentially end to end around the axis, each hub sector being connected to an adjacent hub sector by a longitudinal weld bead, which extends over substantially the entire axial extent of the hub, and which is substantially aligned axially with a hollow portion of the flange.

Preferably, the welding is done by an electron beam. The hub sectors can be produced by casting, and each comprise a flange sector.

Advantageously, to produce each weld bead, the electron beam is inclined with respect to the axis, for example radially towards the outside from a downstream longitudinal end towards an upstream longitudinal end of the casing, and is moved in a substantially longitudinal plane, passing via the axis and the bead to be produced without passing through the material of the flange.

The hollow portions of the flange can either be pre-drafted before assembling the hub, or machined after assembly. The portion which will thus be re-machined (material drop) can be used as a welding "block".

This solution makes it possible to improve the feasibility, the stability and the quality of the assembly method and therefore its cost (as less adjustment necessary) and thus makes it possible for the overall integrated, optimised design of the flange to the hub.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 3a shows, in perspective, the hub sectors which compose this casing.

DETAILED DESCRIPTION

Figure 1:
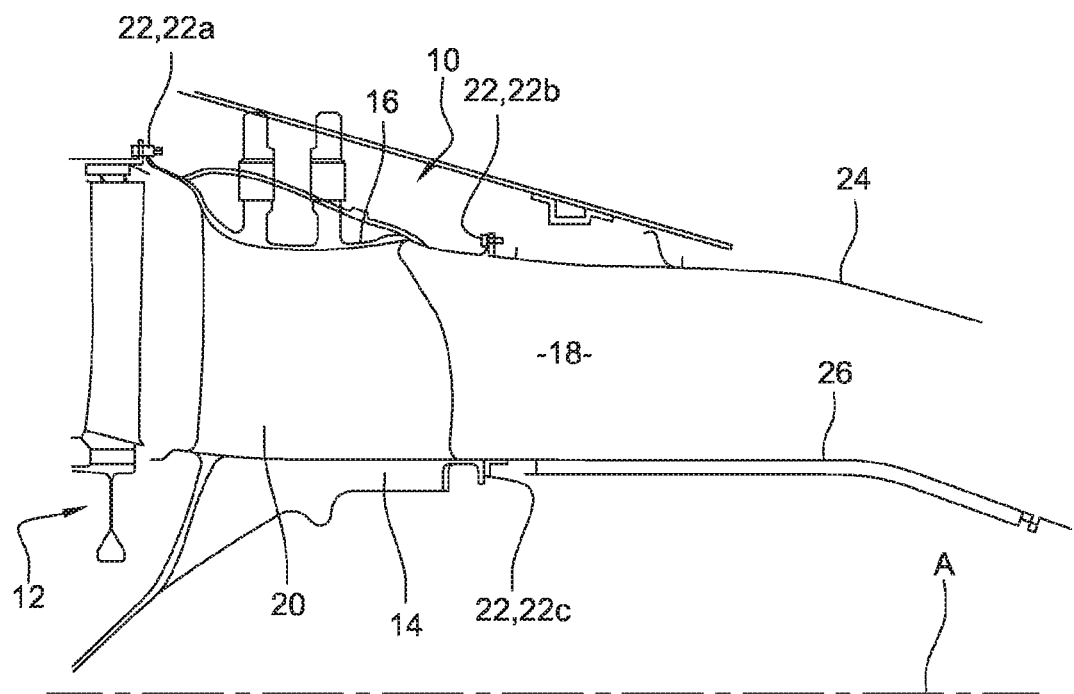
FIG. 1 is a schematic, axial cross-sectional half-view of a downstream turbomachine portion, and shows an exhaust casing.
Figure 2:
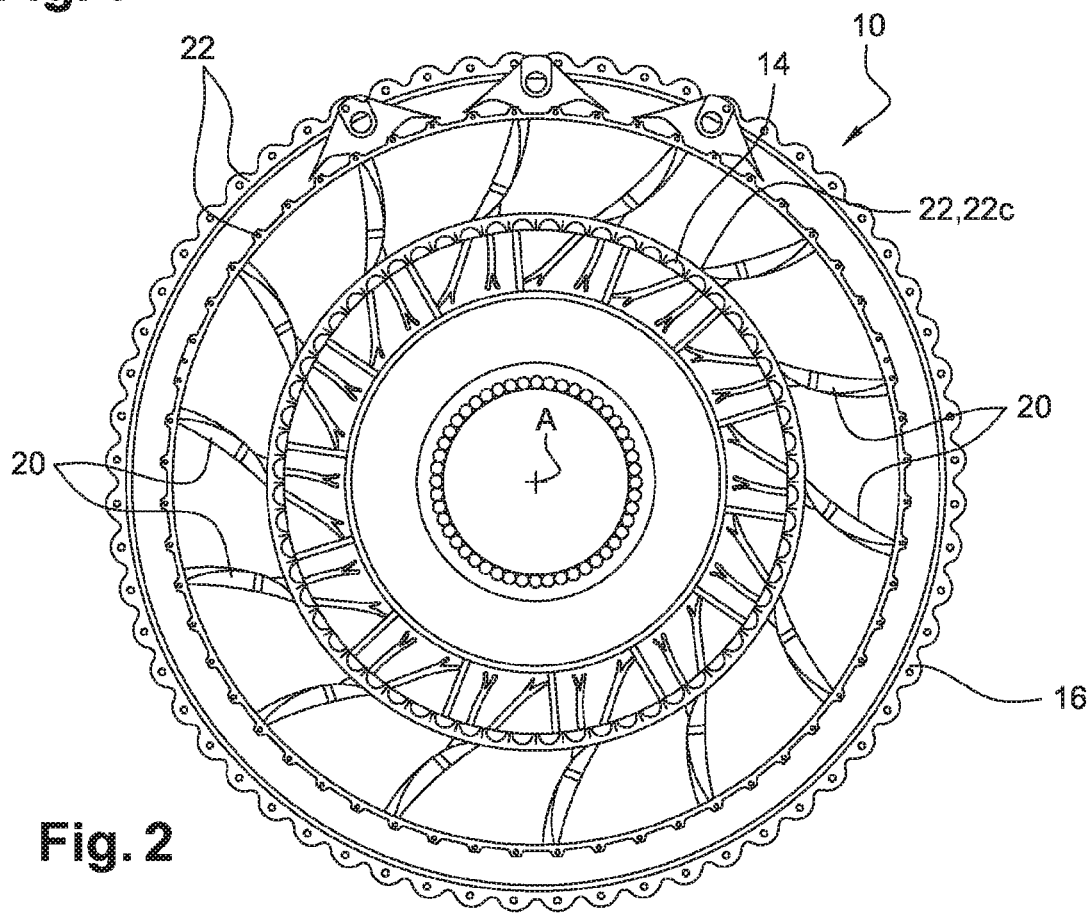
FIG. 2 is a schematic, perspective view of an exhaust casing, front view from downstream.

FIGS. 1 and 2 represent a casing 10, here an exhaust casing, of an aircraft turbomachine.

Conventionally, a turbomachine comprises a gas generator comprising, from upstream to downstream, in the flow direction of the gas streams, at least one compressor, a combustion chamber, and at least one turbine. Downstream of the turbine 12, is situated the exhaust casing 10 which mainly comprises an inner hub 14 and an outer annular ferrule 16 which extends around the hub and an axis of revolution A which is the longitudinal axis of the turbomachine. In the present application, the expressions "radial" and "radially" make reference to the axis of revolution of the hub or of the casing.

The ferrule 16 and the hub 14 together define an annular flow path 18 for the combustion gases exiting the turbine 12.

The ferrule 16 and the hub 14 are rigidly connected to each other by arms 20, substantially radial with respect to the axis A. The arms 20 can be inclined with respect to the planes passing via the axis A. Advantageously, the arms 20 extend into the planes, substantially tangent to a circumference centred on the axis A, as can be seen in FIG. 2.

The casing 10 comprises flanges 22 for fixing to other elements of the turbomachine. These mounting flanges 22 are situated at the upstream and downstream longitudinal ends of the casing. In the example represented, the ferrule 16 comprises an annular flange 22a, 22b at each of its upstream and downstream longitudinal ends. The upstream flange 22a is fixed to a downstream end of a casing of the turbine 12 and the downstream flange 22b is fixed to an upstream end of an exhaust nozzle 24.

The hub 14 comprises, at the downstream longitudinal end, an annular flange 22c for fixing to an upstream end of an exhaust cone 26 surrounded by the nozzle 24.

The flange 22c is scalloped, i.e. it comprises solid portions regularly distributed about the axis A and spaced apart from each other by hollow portions.

In the prior art, the casing 10 is manufactured by returning and by fixing the ferrule 16 and the arms 18 on a hub 14 which is one-piece and produced from one single part, generally by casting.

Figure 3:
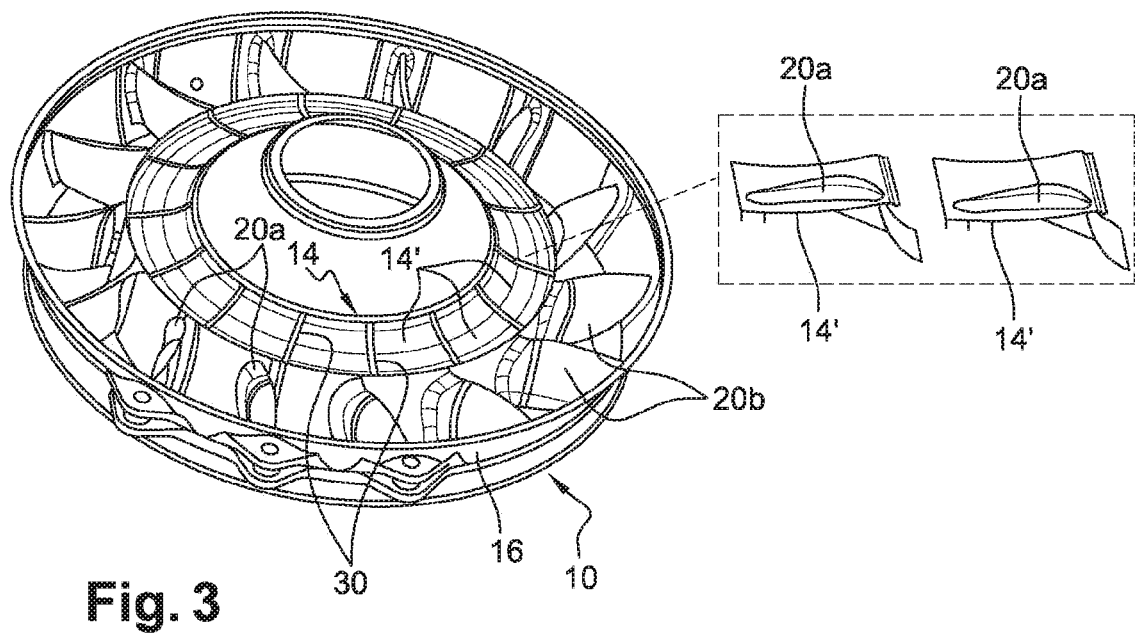
FIG. 3 is a schematic, perspective view of an exhaust casing according to the disclosure.

FIG. 3 illustrated a principle of the disclosure, consisting of manufacturing such a casing from a hub 14, sectored and therefore formed by assembling several hub sectors 14' arranged circumferentially end to end and fixed to each other by welding, preferably by electron beam or EB welding.

FIG. 3a shows the hub sectors 14' which each comprise a radially inner portion 20a of an arm. The number of sectors 14' here is equal to the number of arms 20 and each hub sector 14' is associated with a radially inner portions 20a of an arm. The hub sector 14' and the portion of arm 20a are formed from one single part by casting. The radially outer portions 20b of the arms are thus returned and fixed on the portions 20a, and the ferrule, sectored or not, is also returned and fixed on the portions 20b. The fixing of the different portions of the casing can be done by welding, preferably EB welding.

Figure 4:
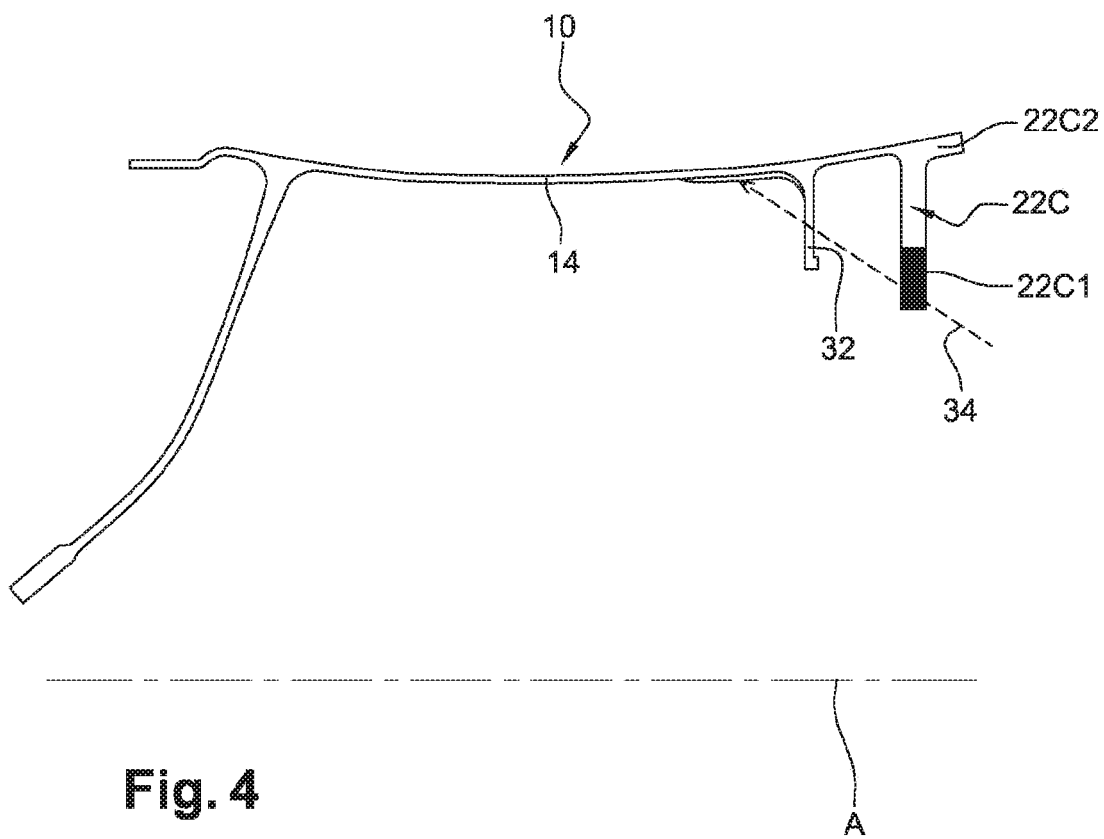
FIG. 4 is an axial cross-sectional partial schematic view of an exhaust casing.

In the case of an EB welding, and such as represented in FIGS. 3 and 4, each hub sector 14' is connected to an adjacent hub sector by a longitudinal weld bead 30 which extends over substantially the entire axial extent of the hub.

To produce each weld bead, the electron beam is inclined with respect to the axis A, for example radially towards the outside from a downstream longitudinal end towards an upstream longitudinal end of the casing, and is moved in a substantially longitudinal plane passing via the axis and the bead to be produced, and which corresponds to the plane of the drawing sheet of FIG. 4

The reference 34 to FIG. 4 means the electron beam. It is oriented towards the zone to be welded, i.e. at the level of the junction zone between two longitudinal edges opposite two adjacent hub sectors. The beam 34 here passes through successively three skins or walls, namely the edges to be welded, an inner annular stiffener 32 of the hub, and the flange 22c. Indeed, the solid portions 22c1 of the flange 22c are situated on the trajectory of the beam and are therefore passed through by the latter. This is not the case for the hollow portions 22c2. This specific case is naturally connected to the inclination angle of the electron beam vis-à-vis the axis A, but this angle can be imposed by the general shape of the casing.

As mentioned in the above, EB welding is capable of passing through several skins, but this requires more power and leads to less stability in the quality of the welding obtained.

The disclosure makes it possible to overcome this problem, thanks to the axial alignment of the weld bead 30 between two hub sectors 14' with a hollow portions 22c2 of the scalloped flange 22c.

Figure 5:
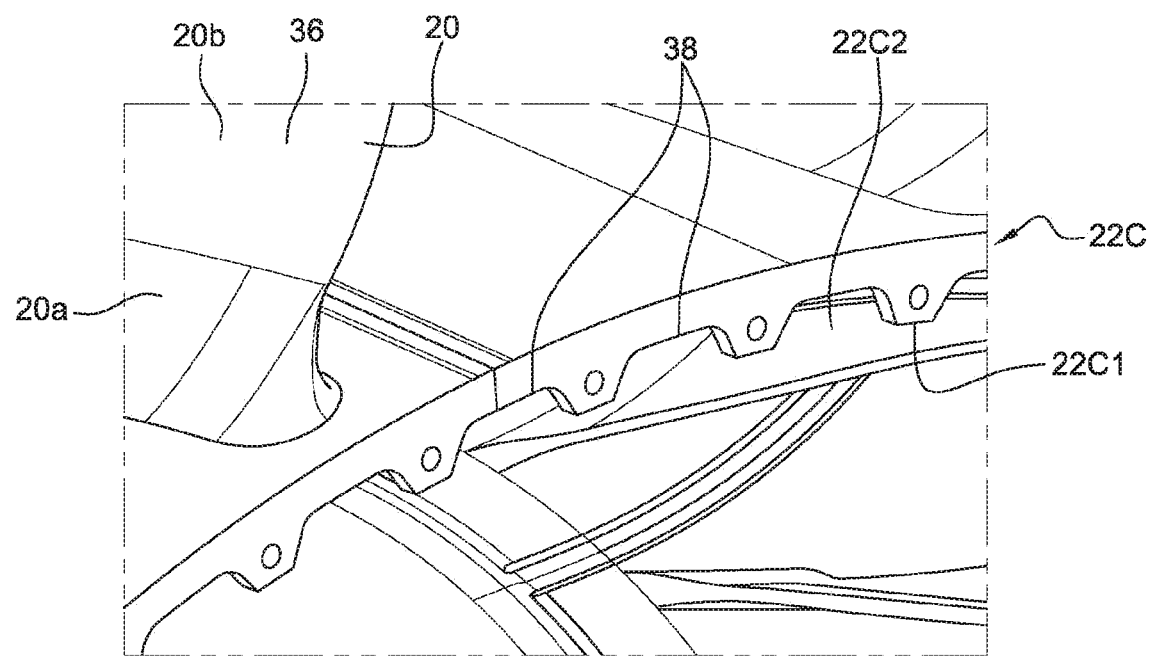
FIGS. 5 and 6 are schematic, perspective views of the casing of FIG. 3, and shows a flange, downstream from this casing.
Figure 6:
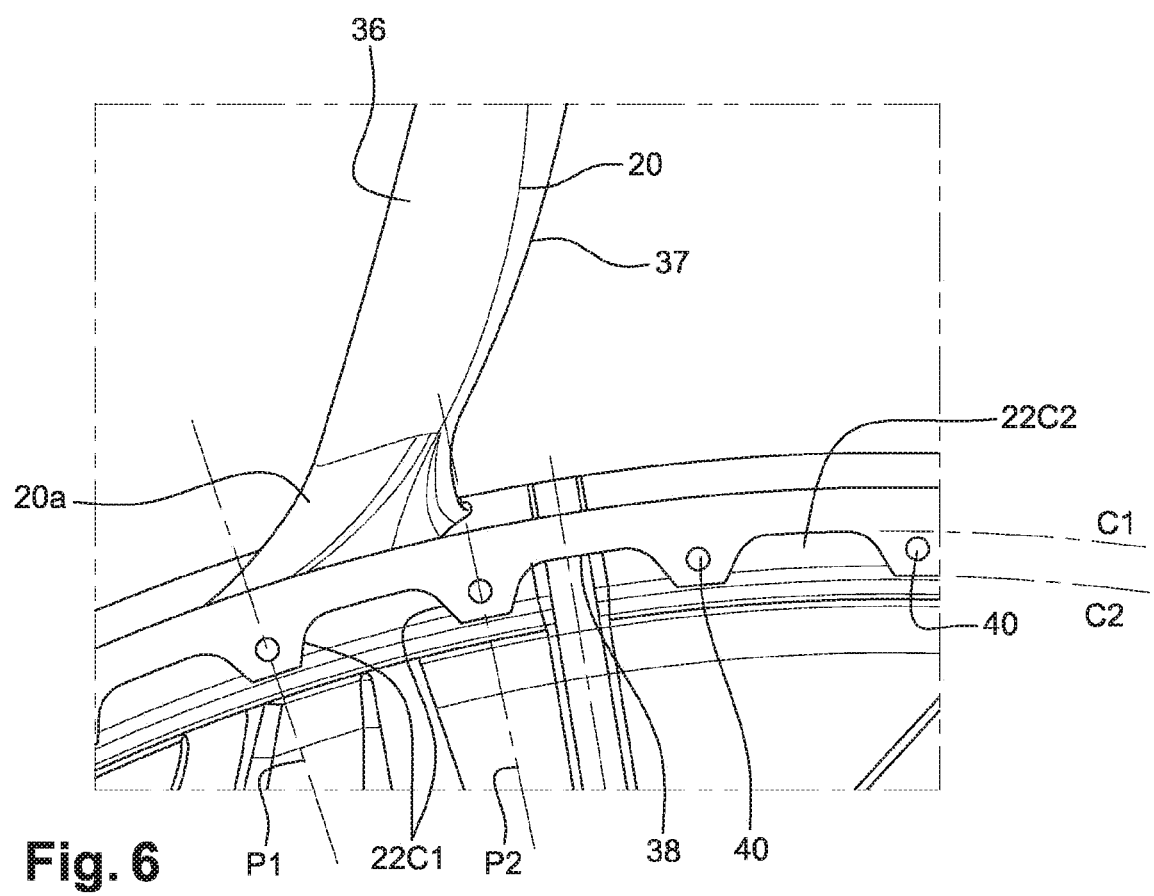
Figure 7:
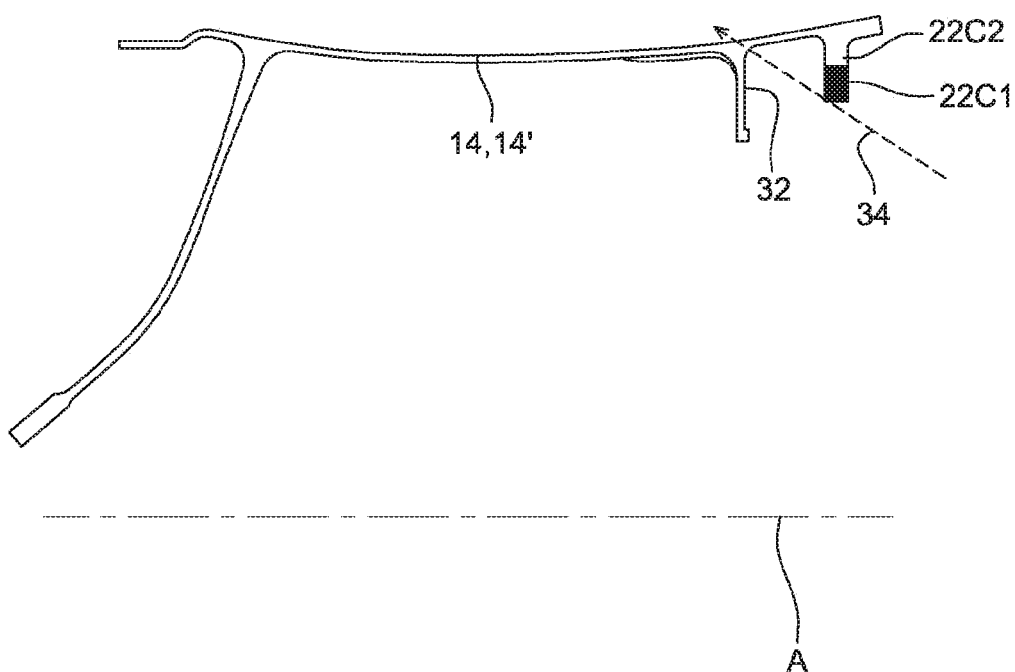
FIG. 7 is a perspective partial schematic view of the exhaust casing of FIG. 3.

FIGS. 5 to 7 make it possible to illustrate the disclosure.

It is observed, in these figures, that the radially inner portion 20a of each arm 20 is substantially situated between a first longitudinal plane P1 passing via the axis A and one of the solid portions 22c1 of the flange, and a second longitudinal plane P2 passing via the axis A and another consecutive portion of these solid portions. The solid portions 22c1 are situated halfway from the portion 20a of the arm. In other words, the solid portions are placed symmetrically on either side of this portion of the arm.

Each arm 20 comprises an upper surface 36 and a lower surface 37. Each weld bead 30 extends between the upper surface of a first arm and the lower surface of a second consecutive arm, and is situated closer to the lower surface of the second arm than the upper surface of the first arm in the example represented.

The hollow portions 22c2 of the flange 22c each comprise a median edge 38, substantially straight-lined and tangent to a circumference C1 centred on the axis A. The solid portions 22c1 also each comprise a median edge, substantially straight-lined and tangent to a circumference C2 centred on the axis A. These solid portions 22c1 are furthermore pierced with orifices 40 for passing of screw-nut type means.

FIG. 7 illustrates the passing of the electron beam 34 at the level of the zone of the flange 22c. It is observed that, because of the axial alignment of the zone to be welded with a hollow portion 22c2 of the flange 22c, or even also because of the resizing of the flange, especially in the thickness and/or radial size, the beam does not pass through the flange 22c. The welding can thus be of the double-skin type, if the beam must pass through the stiffener 32, which is the case in the example represented.

The invention claimed is:

1. A casing for a turbomachine, comprising:
an inner hub with an axis of revolution; and
an outer annular ferrule extending around the inner hub, the outer annular ferrule configured to define, with the inner hub, an annular flow path for a gas stream, and rigidly connected to the inner hub by arms, the inner hub comprising a scalloped annular flange at a longitudinal end of the inner hub,
the scalloped annular flange extending radially inward with respect to the axis of revolution from a flow path wall of the inner hub, the scalloped annular flange comprising a plurality of solid portions regularly distributed about the axis of revolution and spaced apart from each other by a plurality of hollowed portions,
wherein a radially inner portion of each of the arms is situated between two consecutive solid portions, the radially inner portion of each of the arms defining a perimeter of each of the arms at the flow path wall,
wherein the inner hub is produced by assembling, by welding, several angular hub sectors arranged circumferentially end to end around the axis of revolution, each of the several angular hub sectors connected to an adjacent angular hub sector by a longitudinal weld bead extending over an entire axial extent of the inner hub and aligned with a hollowed portion of the plurality of hollowed portions of the scalloped annular flange.

2. The casing of claim 1, wherein the number of the several angular hub sectors is equal to the number of arms of the casing.

3. The casing of claim 1, wherein each of the several angular hub sectors is initially formed from one single part with the radially inner portion of one of the arms.

4. The casing of claim 1, wherein each arm comprises an upper surface and a lower surface, each longitudinal weld bead extending between the upper surface of a first arm of said arms and the lower surface of a second arm of said arms which is consecutive to the first arm, and each longitudinal weld bead being situated closer to the lower surface of the second arm than the upper surface of the first arm.

5. The casing of claim 1, wherein the plurality of hollowed portions each comprise a median edge, straight-lined and tangent to a circumference centered on the axis of revolution.

6. The casing of claim 1, wherein the arms extend into planes, tangent to a circumference centered on the axis of revolution.

7. A turbomachine comprising at least one casing according to claim 1.

8. A method for manufacturing a casing for a turbomachine, the casing comprising an inner hub and an outer annular ferrule extending around the inner hub and an axis of revolution, the outer annular ferrule configured to define, with the inner hub, an annular flow path for a gas stream and rigidly connected to the inner hub by arms, the inner hub comprising, at a longitudinal end, a scalloped annular flange extending radially inward with respect to the axis of revolution from a flow path wall of the inner hub, the scalloped annular flange comprising a plurality of solid portions regularly distributed about the axis of revolution and spaced apart from each other by a plurality of hollowed portions, wherein a radially inner portion of each of the arms is situated between two consecutive solid portions, the radially inner portion of each of the arms defining a perimeter of each of the arms at the flow path wall, the method comprising:
assembling, by welding, several angular hub sectors arranged circumferentially end to end around the axis of revolution, each of the several angular hub sectors being connected to an adjacent angular hub sector by a longitudinal weld bead extending over an entire axial extent of the inner hub, and aligned with a hollowed portion of the plurality of hollowed portions of the scalloped annular flange.

9. The method of claim 8, wherein the welding is performed by an electron beam.

10. The method of claim 9, wherein, to produce each longitudinal weld bead, the electron beam is inclined with respect to the axis of revolution, and is moved into a longitudinal plane passing via the axis of revolution and the longitudinal weld bead to be produced, without passing through a material of the scalloped annular flange.

11. The method of claim 10, wherein the electron beam is inclined with respect to the axis of revolution radially towards an outside from a downstream longitudinal end towards an upstream longitudinal end of the casing.

12. The method of claim 9, wherein the electron beam passes directly through successively an edge of the longitudinal weld bead to be welded and an inner annular stiffener of the inner hub.

13. The casing of claim 1, wherein the several angular hub sectors of the inner hub are produced by casting.

14. The casing of claim 1, wherein the several angular hub sectors of the inner hub each comprises a flange sector of the scalloped annular flange.

15. The casing of claim 1, wherein the radially inner portion of each of the arms is situated between a first longitudinal plane passing through the axis of revolution of the inner hub and one of the solid portions of said scalloped annular flange, and a second longitudinal plane passing through the axis of revolution of the inner hub and another consecutive solid portion of the plurality of solid portions.

16. The casing of claim 1, wherein the radially inner portion of each of the arms is situated halfway from two consecutive solid portions.

17. The casing of claim 1, wherein the plurality of solid portions and the plurality of hollowed portions are situated in a radial plane which is perpendicular to the axis of revolution of the inner hub.

\* \* \* \* \*